Dec. 31, 1968    M. J. SMITH    3,419,468
EXTRUDED GRAPHITE MATRIX CONTAINING COATED PARTICLES
Original Filed Aug. 23, 1963
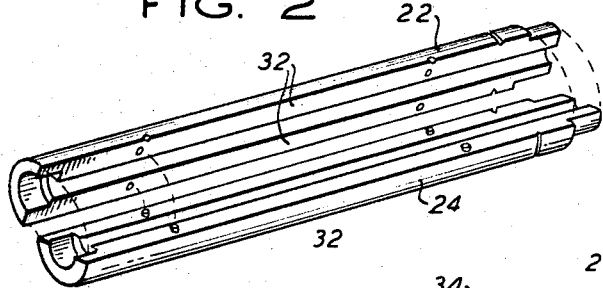
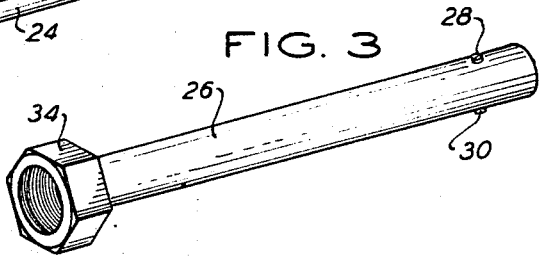
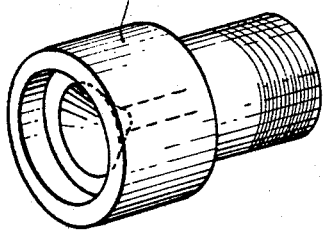
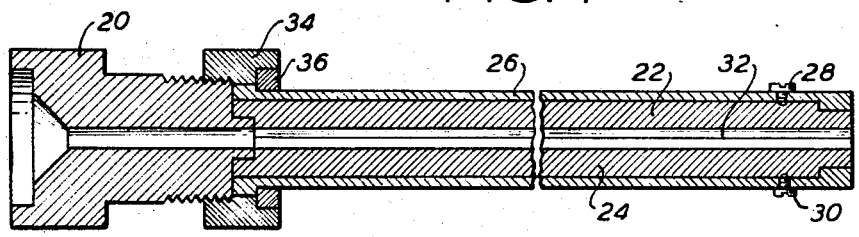
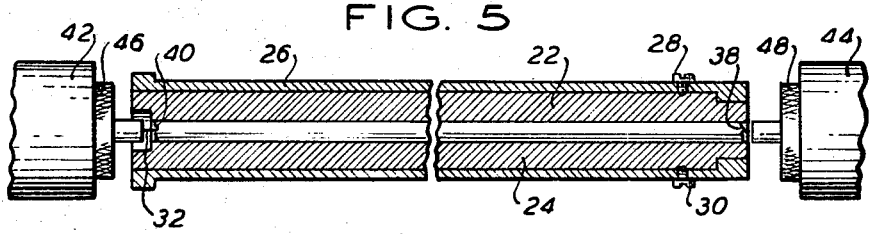
INVENTOR
MARK J. SMITH
BY Robert J. Crawford
ATTORNEY United States Patent Office
3,419,468
Patented Dec. 31, 1968

3,419,468
EXTRUDED GRAPHITE MATRIX CONTAINING COATED PARTICLES
Mark J. Smith, Wilson, N.Y., assignor to Air Reduction Company, Incorporated, New York, N.Y., a corporation of New York
Continuation of application Ser. No. 539,836, Apr. 4, 1966, which is a division of application Ser. No. 304,194, Aug. 23, 1963. This application July 6, 1967, Ser. No. 653,300
1 Claim. (Cl. 176—69)

ABSTRACT OF THE DISCLOSURE

A nuclear fuel rod of heterogeneous composition and predetermined length consisting of nuclear fuel particles with unbroken coatings distributed throughout an extruded graphite matrix.

---

This application is a continuation of a prior co-pending application, Ser. No. 539,836 filed Apr. 4, 1966, and now abandoned, which application is a division of prior co-pending Application Ser. No. 304,194, filed Aug. 23, 1963, now Patent No. 3,255,277.

This invention relates to a method and apparatus for extrusion of a graphite matrix containing coated nuclear fuel particles, and more particularly the avoidance of broken coatings during fabrication and in the finished article.

Rod-like articles made by an extrusion process are normally extruded continuously in long lengths and are then cut to the desired finished length. Fuel rods containing coated fuel particles in a graphite matrix can be formed by extrusion methods but cannot be extruded continuously and cut to length inasmuch as any cutting operation would necessarily destroy or break the coating on the fuel particles which form part of the severed surface. The coating commonly comprises pyrocarbon, pyrographite or the oxides of metals such as aluminum and beryllium and is able safely to retain gases which may form within the coating when the coated particle is irradiated. If the coating is broken or destroyed, these gases can escape and it is necessary that such escape be prevented. The fuel particles primarily contemplated are nuclear fuel particles, usually composed of uranium carbide, uranium oxide, thorium carbide, thorium oxide, or alloys thereof. The gasses that are formed under irradiation when these materials react with neutrons to undergo nuclear fission are termed "fission product gases" and may be comprised of isotopes such as krypton–85 and xenon–133.

In accordance with the invention, rupture or destruction of the particle coatings is avoided by taking advantage of this fact. It has been found that when the material of an extruded rod is broken while still hot and in a pliable or plastic condition, the rupture takes place in the binder material surrounding the coated particles, selectively avoiding rupturing the particle coatings. This preferential rupturing has been found to be characteristic of a hot carbonaceous extrusion containing an admixture of the coated particles. The length of rod broken off while hot is made slightly greater than the desired finished length and the rod is then compressed and formed with "square" ends as desired while the material is still hot. The finished rods made in this way are found to contain no fuel particles that have broken coatings.

Further in accordance with the invention, apparatus is provided to facilitate the carrying out of the above described method.

Other features, objects and advantages will appear from the following more detailed description of an illustrative embodiment of the invention, which will now be given in conjunction with the accompanying drawings.

In the drawings,
FIG. 1 is an axial or longitudinal sectional view of an illustrative embodiment of apparatus useful in practicing the invention;
FIG. 2 is a perspective view of a split die like that shown in axial section in FIG. 1;
FIG. 3 is a perspective view of a die shell for supporting the split die shown in FIGS. 1 and 2; together with a retaining nut therefor;
FIG. 4 is a perspective view of a die adapter or nozzle for coupling the die shell and split die to a source of molten material to be extruded into the die;
FIG. 5 is a view, mostly in axial section, showing an extruded charge of plastic material in the split die after the die has been detached from the nozzle and before final molding of the plastic material, the die being shown as between press jaws with molding caps at each end of the die ready to form flat ends upon the extruded charge and mold it to a desired finished length; and
FIG. 6 is an elevational view of a finished rod after removal from the die.

Referring to the drawings, FIG. 1 shows in axial section illustrative apparatus for molding nuclear fuel rods in accordance with the invention. A die adapter or nozzle 20 is shown which will be attached in known manner to the container of a hydraulic ram. The container will hold the mix which is to be extruded through the nozzle 20 to form the nuclear fuel rod.

A suitable mix that has been successfully employed in practicing the invention contains five percent by weight of coated nuclear fuel particles in a matrix which is composed of about two-thirds by weight of 200 mesh graphite and one-third #30 coal-tar pitch. In this matrix the fuel particles constitute about 0.10 to 0.15 gram per cubic centimenter of the matrix. The mix has a softening point of about 100° C. For extrusion, the mix is maintained in the range between 105° and 125° C., being preferably at about 120° C. in the container.

The mix is extruded into a split die to form a cylindrical rod. The die halves 22 and 24 are shown in axial section in FIG. 1. The die halves may be doweled or bolted together in any known manner and may be grooved at the parting line to facilitate prying the halves apart for removal of the finished rod from the die. During extrusion and molding, the die is contained within a shell 26 and retained therein by set screws 28 and 30 which engage in grooves in the die halves as shown. The parting line between the die halves is indicated at 32. The combination of the die shell 26 and the enclosed die halves is coupled to the nozzle 20 by means of a retaining nut 34, which may include a steel bearing ring 36 tack welded to the main body of the nut. The nut 34 makes a threaded engagement with the outer surface of the nozzle 20 as shown.

The split die halves are shown separately, in isometric view in FIG. 2, the die shell with retaining nut is shown in FIG. 3, and the nozzle is shown in FIG. 4.

In the molding operation, with the nozzle 20 coupled to the die by means of the die shell 26 and retaining nut 34 as shown in FIG. 1, the mix from the container is extruded by means of the hydraulic ram until the forward boundary of the extrusion reaches a point in the die about one-sixteenth of an inch short of the open end of the die. At this time the temperature of the die is about 110° C. and the extruded material in the die is in a readily rupturable plastic state, and sufficiently viscous to substantially retain its shape in the die.

Next, the retaining nut 34 is uncoupled from the nozzle and removed from the die shell. With the die still hot, the die and die shell are separated as a unit from the nozzle, thereby rupturing the extruded mass at the nozzle end by preferential rupture in the matrix material without danger of breaking or destroying the coating of any fuel particle which may be included along the surface of cleavage. The separating motion is usually accompanied by a slight downward motion on the outer end of the die, producing a bending force to insure the fracture transversely through the matrix material.

It will be noted that, as is ordinarily the case, the molding temperature of the matrix material is not high enough to have any deleterious effect upon the fuel particles.

FIG. 5 shows the extruded mass which is left in the die after the separation has been effected. At the right hand end of the die as viewed in FIG. 5, the somewhat irregular shaped leading edge 38 of the extrusion is seen just inside the end of the die opening. At the left-hand end of the die, the also somewhat irregularly broken surface 40 of the extrusion is seen just inside the left-hand end of the die opening proper.

With the die still hot, the assemblage of die shell 26 and die with the extrusion therein is placed between press jaws 42, 44 of a suitable conventional press, with shouldered molding caps 46 and 48 at the opposite ends of the die and the plungers on the molding caps are forced into the die at the two ends until the shoulders of the respective molding caps are stopped at the end surfaces of the die. By this operation, flat ends are formed on the fuel rod while the extrusion is still in a plastic state and the length of the finished rod is determined precisely by the distance between the confronting projections of the stud portions of the two molding caps. The tolerances of the rough, or broken off, length of the fuel rod are fairly closely held according to the present breaking-off step and, in 12 inch articles for example of the type generally contemplated, the maximum foreshortening accomplished during the sizing operation from the opposite ends is approximately ⅛″ total. No absolute limit has been found for the increase in compaction density of the extruded rod in its confines within the enclosing split die, however, and at least ideally the material may be forced to reach or approach its theoretical density when compressed from the opposite ends. In practice, of course, the rod is compressed by the molding cap studs only to the point where its length is reduced to the length desired, and no farther.

After molding and cooling, the set screws 28, 30 is retracted, the die removed from the die shell, and the finished rod is then removed by prying apart the two halves of the split die, whereupon the rod appears as shown in elevation in FIG. 6.

While illustrative forms of apparatus and methods in accordance with the invention have been described and shown herein, it will be understood that numerous changes may be made without departing from the general principles and scope of the invention.

I claim:

1. A nuclear fuel rod of heterogeneous composition comprising an extruded length of graphite containing a distribution therein of coated nuclear fuel particles, said extruded length having end portions compacted toward the center of said length, the population of said particles being characterized by the essential absence therein of members exhibiting broken coatings resulting from application of shearing forces transverse to said length.

References Cited
UNITED STATES PATENTS

| | | | |
|---|---|---|---|
| 2,593,507 | 4/1952 | Wainer | 264—.5 |
| 3,121,047 | 2/1964 | Stoughton et al. | 176—91 |
| 3,124,625 | 3/1964 | Sheinberg et al. | 264—.5 |
| 3,135,665 | 6/1964 | Koutz et al. | 176—91 |
| 3,173,973 | 3/1965 | Brockway | 264—.5 |
| 3,224,944 | 12/1965 | Turner et al. | 264—.5 |
| 3,230,280 | 1/1966 | Kennedy | 264—.5 |
| 3,293,332 | 12/1966 | Ingleby | 264—.5 |

CARL D. QUARFORTH, *Primary Examiner.*

R. L. Grudziecki, *Assistant Examiner.*

U.S. Cl. X.R.

176—67; 264—.5